United States Patent [19]

Friedrichs

[11] 3,970,818
[45] July 20, 1976

[54] METHOD AND APPARATUS FOR A THERMISTOR COMPENSATED OVEN

[75] Inventor: Jerome Peter Friedrichs, Des Plaines, Ill.

[73] Assignee: Motorola, Inc., Schaumburg, Ill.

[22] Filed: Oct. 17, 1974

[21] Appl. No.: 515,798

[52] U.S. Cl. .............................. 219/210; 219/505; 307/310; 338/23; 338/25
[51] Int. Cl.² ........................................... H05B 1/00
[58] Field of Search ................... 219/210, 505, 510; 310/8.9; 338/23, 22, 24, 25; 307/310

[56] References Cited
UNITED STATES PATENTS

| | | | |
|---|---|---|---|
| 3,007,023 | 10/1961 | Johnson et al. | 219/210 |
| 3,028,473 | 4/1962 | Dyer et al. | 219/210 |
| 3,252,109 | 5/1966 | White | 219/210 X |
| 3,838,248 | 9/1974 | Uchida | 219/210 |

Primary Examiner—C. L. Albritton
Attorney, Agent, or Firm—James W. Gillman; Victor Myer; Phillip Melamed

[57] ABSTRACT

An oven having a thermistor controlled proportional heating system is compensated for ambient temperature variations by using a second thermistor sensing ambient temperature and connected in series with the control thermistor in an electrical bridge circuit. The control thermistor is mounted within the oven and substantially monitors the oven temperature while the ambient thermistor is located outside the oven and monitors ambient temperature. The electrical bridge circuit produces a temperature control error signal which is amplified and applied to a heater winding which is wrapped around the oven. The ambient thermistor produces a resistance variation in the electrical bridge circuit which modifies the temperature control signal such that a predetermined point inside the oven is held at a constant temperature regardless of any ambient temperature changes.

12 Claims, 5 Drawing Figures

ELECTRICAL BRIDGE CIRCUIT

THERMAL RESISTANCE BRIDGE

METHOD AND APPARATUS FOR A THERMISTOR COMPENSATED OVEN

BACKGROUND OF THE INVENTION

The field of the invention is thermistor controlled ovens used for maintaining a substantially constant oven temperature. Such ovens are commonly used in the electronics industry to maintain crystals used in oscillator circuits at a precise temperature.

Heating systems which cycle on and off between predetermined temperature limits are known but such systems exert no control when the oven temperature is within the predetermined limits. Also cycling systems have abruptly changing power requirements and can create unwanted noise signals on the power supply lines. Double ovens having two thermistors, one thermistor monitoring each oven temperature, are also used to maintain a precise oven temperature but waste space and electrical power. Cycling heating systems having an ambient temperature themistor and a control thermistor are known but the ambient thermistor variations merely change the cycling rate of the heating system in response to a change in ambient temperature.

Ovens using a closed loop thermistor controlled proportional heating system are known but such ovens do not maintain a constant oven temperature as ambient temperature varies unless they are mechanically compensated by adjusting a thermal resistance path such as described in U.S. Pat. No. 3,252,109. Such mechanically compensated ovens are bulky and waste oven space.

The present invention provides an electronic method of temperature compensating an oven instead of the previous cumbersome mechanical compensation method. Known systems have not normally distinguished between the control thermistor temperature and the actual oven temperature, and when the oven consists of a nonsymmetrical cavity, the temperature differences can be quite appreciable. The present invention provides a method for maintaining any point within a nonsymmetrical oven cavity at a constant temperature regardless of ambient temperature variations and no prior system provides such a method.

SUMMARY OF THE INVENTION

An object of this invention is to provide an improved method and apparatus for maintaining a desired point within a temperature controlled oven at a constant temperature.

Another object of the invention is to provide an improved proportionally temperature controlled oven which maintains a point within the oven at a constant temperature in spite of ambient temperature variations.

A method according to the invention for maintaining a constant temperature at a desired point within an oven as the ambient temperature changes, includes the steps of; providing an oven having such a desired point at one location therein, sensing the temperature at a second location inside of said oven; producing a control signal whose magnitude varies inversely with respect to the magnitude of said temperature at said second location, providing continuous heat to said oven proportionally to the magnitude of said control signal, sensing ambient temperature at a third location exterior to said oven, and varying continuously the magnitude of said control signal in a predetermined relationship to said sensed ambient temperature.

In an embodiment of the present invention, an oven is provided with a thermistor mounted inside and this thermistor generally senses the oven temperature. The oven thermistor is connected in an electrical bridge circuit and the bridge circuit produces a control signal which is amplified and then applied to a heater winding which is wrapped around the oven. The thermistor is connected in the bridge circuit so that a closed loop negative feedback system is obtained, i.e. as the temperature of the oven goes up the magnitude of the control signal is reduced. At equilibrium the heat supplied by the winding wrapped around the oven will just equal the heat lost to the surroundings (which are at ambient temperature) and the oven and the thermistor temperature will be maintained at a constant value as long as the ambient temperature remains constant. As ambient temperature varies the amount of heat lost to the surroundings also varies and this would normally result in a slight change in the oven and the thermistor temperatures. However, in the present invention a second thermistor sensing ambient temperature is included in the electrical bridge circuit and provides a resistance variation which modifies the control signal in response to ambient temperature changes and thus enables the oven temperature to be maintained at a constant value while the ambient temperature changes.

BRIEF DESCRIPTION OF THE DRAWINGS

For a more complete understanding of the invention reference should be made to the drawings in which.

DETAILED DESCRIPTION OF THE INVENTION

Figure 1:
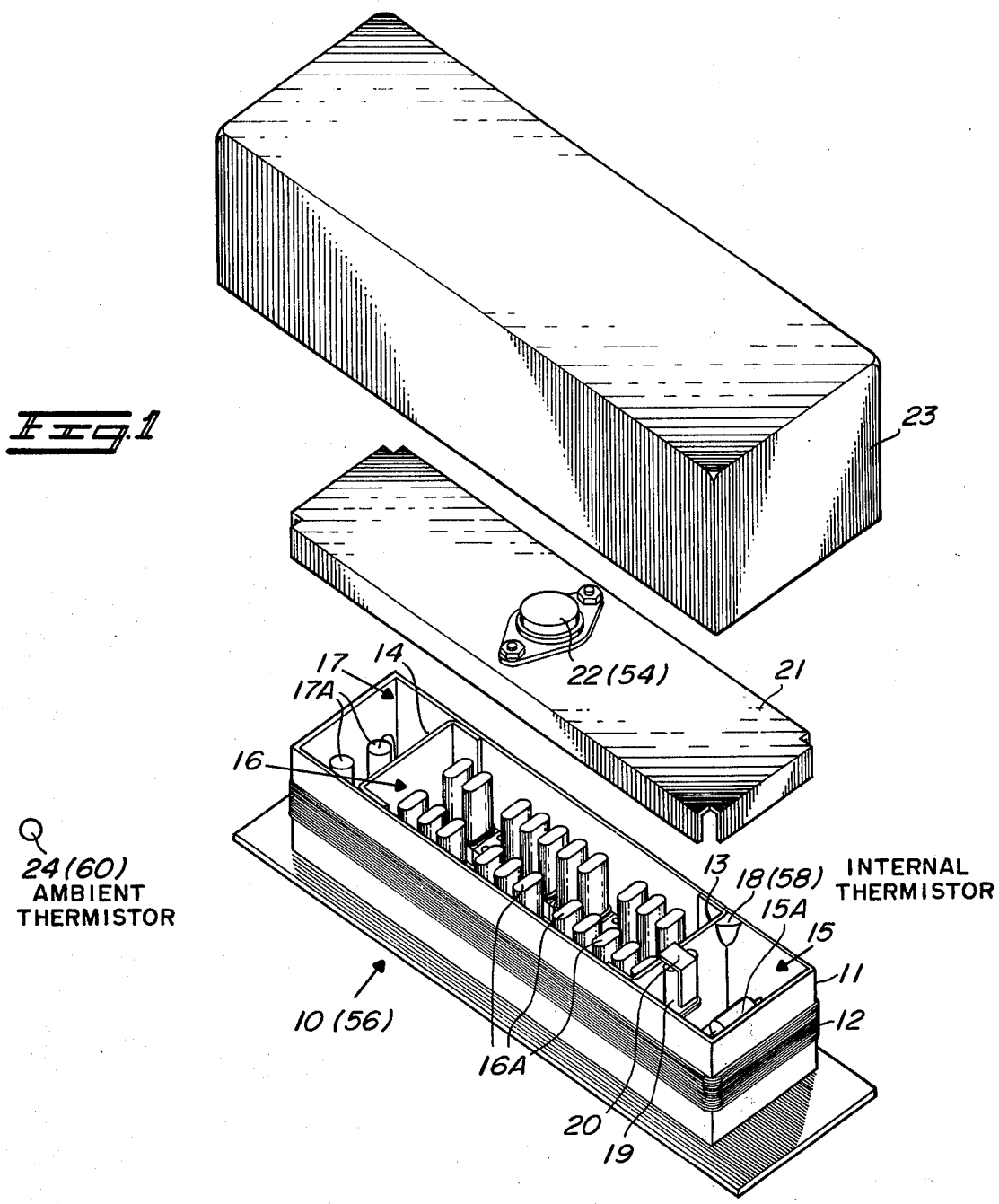
FIG. 1 is an exploded pictorial view of the mechanical placement of parts in a thermistor controlled oven.

FIG. 1 shows the mechanical arrangement of an oven generally referred to as 10 having an exterior rectangular metal casing 11 and a heater winding 12 wrapped around the metal casing 11. The oven 10 has interior walls 13 and 14, which along with exterior metal casing 11 form three internal cavities in oven 10, generally referred to as 15, 16, and 17. A thermistor 18 is mounted inside cavity 15 which also contains a master crystal 19 and a metal support clip 20 attaching crystal 19 to internal wall 13. Components 15A for a crystal oscillator circuit are shown mounted in cavity 15, additional temperature sensitive crystals 16A are shown mounted in cavity 16, and temperature sensitive components 17A of a proportional heating control system are shown mounted in cavity 17. A metal cover 21 fits on top of external case 11 and a power transistor 22 is shown mounted and heat sunk to cover 21. An insulating cover 23 fits over casing 11, cover 21, and winding 12, and a thermistor 24 is shown outside of insulating cover 23 and senses ambient temperature.

Figure 2:
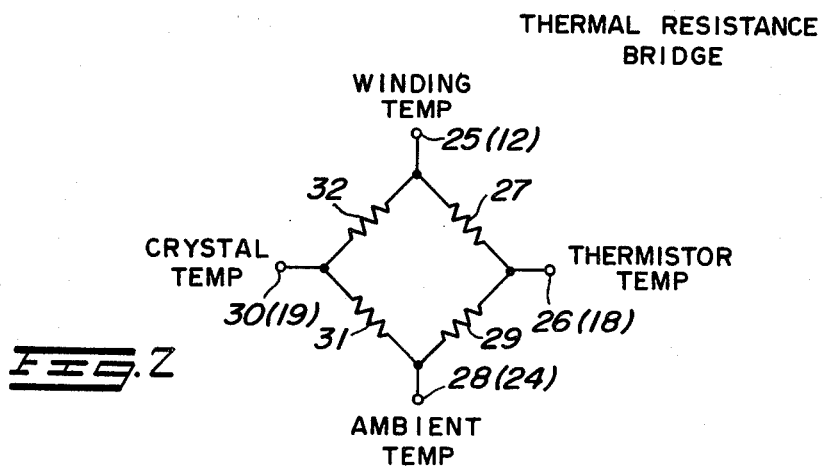
FIG. 2 is a thermal resistance diagram of various oven temperatures.

FIG. 2 illustrates a thermal resistance bridge diagram of the temperature of various components shown in FIG. 1. A terminal 25, which represents the temperature of winding 12 in FIG. 1, is connected to a terminal 26, which represents the temperature of thermistor 18 in FIG. 1, through a resistor 27 which represents the thermal resistance path between winding 12 and thermistor 18. A terminal 28, which represents the ambient temperature measured by thermistor 24 in FIG. 1, is connected to terminal 26 through a resistor 29 which represents the thermal resistance path between thermistor 18 and ambient. A terminal 30, which represents the actual temperature of master crystal 19 in FIG. 1, is connected to terminal 28 through a resistor 31 representing the thermal path between crystal 19 and ambient, and terminal 30 is connected to terminal 25 through a resistor 32, which represents the thermal path between winding 12 in FIG. 1 and crystal 19 in FIG. 1. Thermal bridge diagrams are common and FIG. 2 merely illustrates that changes in ambient temperature do not necessarily affect the crystal temperature (30) and the thermistor temperature (26) in the same manner. Obviously an increase in ambient temperature (28) may affect the thermistor temperature at terminal 26 to a greater or lesser extent than it affects the crystal temperature at terminal 30, depending upon the values of thermal resistances 27, 29, 31, and 32. The bridge circuit in FIG. 2 also illustrates the fact that even if the thermistor temperature present at terminal 26 is kept constant as the ambient temperature present at terminal 28 is varied, this does not insure that the crystal temperature at terminal 30 will also remain constant unless the ratio of thermal resistance 31 to resistance 32 equals the ratio of resistance 29 to resistance 27.

Figure 3:
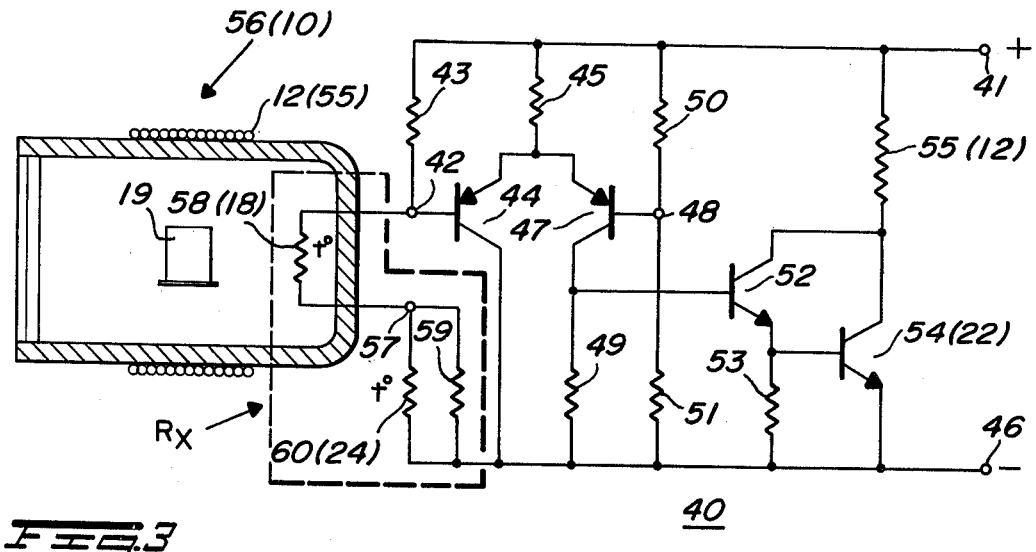
FIG. 3 is a schematic diagram of a closed loop proportional heating control system for the oven shown in FIG. 1.

FIG. 3 illustrates a closed loop proportional heating negative feedback control system 40 for the oven 10 shown in FIG. 1. A terminal 41 receives a positive DC power supply voltage and is connected to a terminal 42 through a resistor 43. A PNP transistor 44 has its base connected to terminal 42, its emitter connected to terminal 41 through a resistor 45, and its collector connected to a terminal 46 which receives a negative DC supply voltage. A PNP transistor 47 has its emitter connected to the emitter of transistor 44, its base connected to a terminal 48, and its collector connected to terminal 46 through a resistor 49. Terminal 48 is connected to terminal 41 through a resistor 50 and connected to terminal 46 through a resistor 51. An NPN transistor 52 has its base connected to the collector of transistor 47, its emitter connected to terminal 46 through a resistor 53, and its collector connected to the collector of an NPN transistor 54 corresponding to transistor 22 in FIG. 1. The base of transistor 54 is connected to the emitter of transistor 52 and the emitter of transistor 54 is connected to terminal 46. The collector of transistor 54 is connected to terminal 41 through a resistor 55 which represents the resistance of a heater winding 12 (corresponding to winding 12 shown in FIG. 1) shown wrapped around an oven generally referred to as 56 (shown schematically in a cross section view and corresponding to oven 10 in FIG. 1.) Terminally 42 is connected to a terminal 57 through a thermistor 58 (corresponding to thermistor 18 in FIG. 1) which is shown mounted inside oven 56 and substantially monitors the temperature of oven 56. Terminal 57 is connected to terminal 46 through a resistor 59 in parallel with a thermistor 60 (corresponding to thermistor 24 in FIG. 1) which is shown located outside oven 56 and which substantially monitors ambient temperature. A crystal 19 corresponding to crystal 19 in FIG. 1 is shown inside oven 56. Electrical system 40 in FIG. 3 is used to control the temperature of crystal 19 without any abrupt cycling.

Figure 3A:
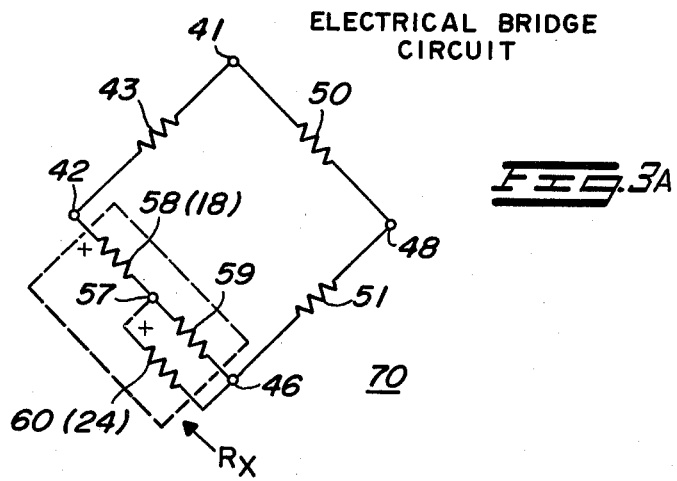
FIG. 3A is a schematic diagram of the electrical bridge circuit shown in FIG. 3.

FIG. 3A illustrates an electrical bridge circuit 70 which is part of FIG. 3 and is redrawn for clarity. Resistors 43, 50 and 51 represent three resistive arms of electrical bridge circuit 70 and thermistors 58, 60 and resistor 59 comprise a fourth arm of the electrical bridge circuit (shown dotted and generally referred to as $R_x$). All components shown in FIG. 3A are identically connected as described in FIG. 3, and FIG. 3A includes terminals 41, 42, 46, 48 and 57. The resistance between terminal 42 and terminal 46, ($R_x$), represents a temperature varying resistance in the electrical bridge circuit 70 of the proportionally controlled heating system 40.

When system 40 is first energized the oven temperature and ambient temperature are identical and the resistances in bridge circuit 70 are such that terminal 42 is at a higher potential than terminal 48. Transistors 44 and 47 form a differential amplifier pair and amplify the voltage difference present between terminals 42 and 48, which represents a heating control signal. Terminals 42 and 48 are terminals at two nonadjacent junctions of resistive arms in electrical bridge circuit 70. An amplified control voltage signal is obtained at the collector of transistor 47 and turns on the Darlington connected transistors 52 and 54 causing a large amount of current to flow through heating resistance 55 (12). Thus the differential amplifier and the Darlington transistors form an amplification means for amplifying the heating control signal. As the temperature of oven 56 increases the resistance value of thermistor 58 (18) will decrease which causes the voltage at terminal 42 to decrease and results in a decrease in the control signal voltage since the voltage at terminal 42 was initially higher than the voltage at terminal 48. Thus the control signal varies inversely with respect to the magnitude of the sensed oven temperature. As the control voltage decreases, a smaller amplified control signal is present at the collector of transistor 47 and this reduced amplified control signal causes less current to flow through heater resistance 55 (12). An equilibrium point will be established when the magnitude of the control signal is such that the power transferred to oven 56 (10) is sufficient to maintain thermistor 58 (18) at a constant resistance value while supplying a constant amount of heat which represents the heat loss of oven 56 (10) to the surroundings (which are at ambient temperature.) Thus system 40 does not contemplate any on-off cycling of heater resistance 55, but merely reduces the power supplied to oven 56 in response to the magnitude of a continuous control signal such that the power supplied just compensates for the external heat loss and maintains the resistance and temperature of the control thermistor at a constant value. In all of the above discussion the ambient temperature was assumed to be at a constant value below the oven temperature.

Figure 4:
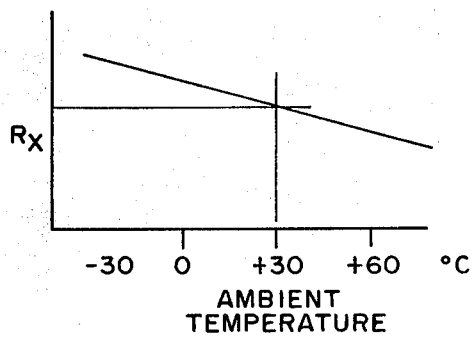
FIG. 4 is a graph plotting the resistance of the temperature sensitive resistance arm in the bridge circuit of FIG. 3 versus ambient temperature variations.

Proportional heating control systems, such as system 40, are known in the state of the art and have many advantages over cycling heating control systems. However in prior proportional heating systems, a constant oven temperature is not maintained when ambient temperature varies. This is easily seen by assuming that the ambient temperature increases which therefore requires less power to be transferred to oven 56 because the external heat losses to ambient are now less. The requirement of less power means that a smaller control signal is now required and (in FIG. 3 and 3A) this results in a decrease of the value of $R_x$. If $R_x$ just consists of the single thermistor 58, as $R_x$ decreases the temperature of thermistor 58 would increase. In FIG. 4 a plot of $R_x$ versus ambient temperature is shown to be a straight line having a negative slope over the ambient temperature range of −30°C to +60°C. (In all practical heating systems the actual oven temperature must be maintained above the highest ambient temperature expected and therefore an oven temperature of +80° C was used in the preferred embodiment.) The magnitude of the slope of $R_x$ versus ambient temperature depends upon the gain of closed loop control system 40 and would be equal to zero only for an infinite gain system which of course is not attainable.

The function of thermistor 60 (24) is now seen to be a temperature varying resistance element which produces a required resistance variation of $R_x$ versus ambient temperature similar to that shown in FIG. 4. Thus thermistor 60 varies the magnitude of the heating control signal in a predetermined relationship to sensed ambient temperature. Since thermistors have a predetermined amount of variation of resistance in response to temperature changes, resistor 59 functions to insure that the magnitude of the resistance variation between terminals 57 and 46 (as ambient temperature varies) is exactly the desired resistance variation. By combining a temperature sensing thermistor inside a temperature controlled oven and a temperature sensing thermistor outside of the oven substantially sensing ambient temperature, a closed loop proportional heating system can be used to exactly compensate for ambient temperature variations.

If, as ambient temperature varies, the resistor variation between terminals 57 and 46 is exactly the same as the resistor variation shown in FIG. 4, then the resistance value and temperature of thermistor 58 (18) will remain exactly constant as ambient temperature varies. However, if the temperature of thermistor 58 is maintained at a constant value and ambient temperature is varied, the temperature of a crystal (19) physically displaced from thermistor 58 may not be held constant, as was mentioned previously when discussing FIG. 2. Holding the thermistor temperature at terminal 26 (in FIG. 2) constant while ambient temperature 28 (in FIG. 2) is varied will not result in the crystal temperature at terminal 30 being held constant unless the ratio of thermal resistance 31 to thermal resistance 32 is equal to the ratio of thermal resistance 29 to thermal resistance 27. The placement of the internal oven thermistor and the crystal located within the oven affects the values of the thermal resistance paths and finding the exact placement of an internal crystal and thermistor to obtain a balanced thermal bridge in a nonsymmetrical oven is practically impossible. In the present system however, the internal crystal (19) and the internal thermistor (18) can be placed anywhere in the oven and by modifying the resistance variation (as a function of ambient temperature) between terminals 57 and 46, the thermistor temperature at terminal 26 can be varied in any manner with respect to ambient. With fixed thermal resistance paths, this will result in the crystal temperature at terminal 30 being held constant if the thermistor temperature at 26 is forced to vary in a predetermined manner with respect to ambient temperature changes by varying the heating control signal in a predetermined relationship to ambient temperature changes.

One way of determining the amount of resistor variation versus ambient temperature required between terminals 57 and 46 to exactly compensate a crystal (19) temperature includes the following steps. Terminals 57 and 46 are shorted together and a single thermistor proportionally controlled heating system is evaluated over the expected ambient temperature variation such as 30 to +60°C and a plot of $R_x$ vs ambient temperature is made. In one such case a control thermistor 58 in system 40 had a resistance of 10K when the oven temperature was +80°C and the ambient temperature was +30°C and experienced a total resistance change of approximately 500 ohms as the ambient temperature was varied over the range of 30°C to +60°C. Thus an ambient thermistor network inserted between terminals 57 and 46 having a net change over the same ambient range of 500 ohms would have exactly compensated for ambient changes and held the temperature at thermistor 58 constant. In order to sense the crystal (19) temperature instead of the thermistor 58 temperature, a thermocouple is inserted into a crystal can and placed at the fixed mechanical location selected for mounting the master crystal 19, the fixed location of oven thermistor 58 being already selected. A resistance decade box having approximately a 500 Ω range is inserted between terminals 57 and 46 and after rebalancing the resistance arms (43, 50 and 51) of the electrical bridge circuit to maintain the same nominal oven temperature at a 30 C ambient, the crystal temperature is monitored as a function of ambient temperature variations. To find the resistance variation (as a function of ambient temperature variation) required between terminals 57 and 46, the ambient temperature is varied and the decade box resistance value is then changed so that the crystal temperature remains constant. A plot of decade box resistance values which would produce a constant crystal temperature as the ambient temperature varies is made. A thermistor value is then selected for the ambient temperature thermistor 60 (24) and an appropriate value for resistor 59 is selected such that the combination of resistor 59 and thermistor 60 creates the resistor variation (as a function of ambient temperature) between terminals 57 and 46 required to maintain a constant crystal temperature which was just determined in the previous step. Therefore a crystal (19) which is to be closely temperature controlled and an internal oven thermistor (18) which substantially monitors oven temperature can be mounted at any two fixed convenient locations within an oven and the inventive proportional heat controlling system can be used to exactly maintain the crystal temperature at a constant value independent of ambient temperature variations.

When the temperature controlled crystal (19) is used in a crystal oscillator circuit, the remaining crystal oscillator components can also be mounted within an oven to minimize their temperature variation characteristics. Also components in proportional control system 40 can be mounted within an oven so that the gain of control system 40 will remain substantially independent of ambient temperature variations. These two aspects are illustrated in FIG. 1 which shows crystal oscillator components 15A in cavity 15 and temperature control system components 17A (which are part of system 40, such as resistors 50 and 51) in cavity 17. In control system 40, transistor 54 (22) is a high current power transistor and can be heat sunk to a portion of the external casing whereby transistor 54 itself will contribute to the heating of the oven in addition to heater winding 55 (12). Power transistor 22 mounted on cover 21 in FIG. 1 shows this particular configuration wherein power transistor 22 corresponds to transistor 54. In the structure of FIG. 1, the temperature of master crystal 19 is held exactly constant by the resistance variations of thermistors 18 (58) and 24 (60).

While in the present embodiment both the internal and external thermistor have been combined in a single leg of an electrical bridge circuit, the thermistors could also have been placed in separate legs of the electrical bridge circuit. While the foregoing disclosure has assumed thermistors to be decreasing in resistance as temperature increases, the use of thermistors which increase in resistance as temperature increases is within the scope of this invention.

While I have shown and described specific embodiments of this invention, further modifications and improvements will occur to those skilled in the art. All such modifications which retain the basic underlying principles disclosed and claimed herein are within the scope of this invention.

I claim:

1. A method for maintaining a constant temperature at a desired point within an oven as the ambient temperature changes, including the steps of;
    providing an oven having such desired point at one location therein,
    sensing the temperature at a second location inside of said oven;
    producing a control signal with an apparatus, the magnitude of said control signal varying inversely with respect to the magnitude of said temperature at said second location,
    providing continuous heat to said oven proportionally to the magnitude of said control signal,
    sensing ambient temperature at a third location exterior to said oven with a sensor at said third location, and
    varying continuously the magnitude of said control signal in a predetermined relationship to said sensed ambient temperature by electrically coupling said sensor to said apparatus.

2. The method of claim 1 where the step of producing said control signal includes the steps of;
    developing a first resistance magnitude proportional to said temperature sensed at said second location, and
    utilizing said first resistance magnitude to produce said control signal.

3. The method of claim 2 wherein the step of varying said control signal includes the steps of;
    developing a second resistance magnitude proportional to said ambient temperature sensed at said third location, and
    utilizing said second resistance magnitude to vary said control signal.

4. A closed loop temperature compensation control system for maintaining a constant temperature at a desired point within an oven as the ambient temperature changes, including in combination:
    an oven having a desired point at one location therein;
    first means for sensing temperature, fixed at a second location inside of said oven;
    control means coupled to said first means for producing a control signal whose magnitude varies inversely with respect to the magnitude of said temperature at said second location;
    heating means for providing continuous heat to said oven proportionally to the magnitude of said control signal, coupled to said producing means and said oven;
    second means fixed at a third location exterior to said oven for sensing ambient temperature; and
    means for continuously varying the magnitude of said control signal in a predetermined relationship to said sensed ambient temperature by electrically coupling said second means to said control means.

5. The system of claim 4 wherein said first means is a first thermistor, and said second means is a second thermistor.

6. The system of claim 5 wherein said control means comprises an electrical bridge circuit including said first thermistor in one of the resistive arms of said bridge circuit.

7. The system of claim 6 wherein said heat providing means includes a heater winding wrapped around said oven and amplifying means coupled to said control means for amplifying said control signal.

8. A closed loop temperature compensation control system for maintaining a desired point within an oven at a constant temperature as the ambient temperature changes, including in combination:
    an oven having an external case substantially surrounding said oven and a desired point at a fixed location inside said oven;
    electrical bridge circuit means having four resistive arms coupled in a loop for producing a control signal which varies according to the resistance values of said resistive arms;
    first thermistor means at a fixed location inside of said oven with respect to said desired point for sensing said oven temperature at the location of said first thermistor means and electrically connected in one of said resistive arms for reducing the magnitude of said control signal in response to a temperature increase of said first thermistor means;
    heating means for said oven being electrically coupled to said bridge circuit means for receiving said control signal and providing heat to said oven continuously and proportional to the magnitude of said control signal; and
    ambient resistance compensation means including a second thermistor located outside of said oven and sensing ambient temperature, said resistance means being electrically connected in one of said resistive arms of said bridge circuit means for continuously varying said control signal in a predetermined amount in response to ambient changes.

9. The system of claim 8 wherein said first thermistor means and said second thermistor are both electrically connected in the same resistive arm of said bridge circuit means.

10. The system of claim 8 wherein said second thermistor is located outside of said oven and substantially the rest of said bridge circuit means is located within said oven.

11. The system of claim 8 wherein said heating means includes amplification means coupled to said bridge circuit means for receiving said control signal and amplifying said control signal.

12. The system of claim 11 wherein a first part of said amplification means is located inside of said oven and a second part of said amplification means is mounted to said external oven case.

* * * * *